April 2, 1963     A. R. CUNNINGHAM     3,083,521
HUB AND TINE ASSEMBLY FOR TEDDER
Original Filed Oct. 25, 1957     2 Sheets-Sheet 1
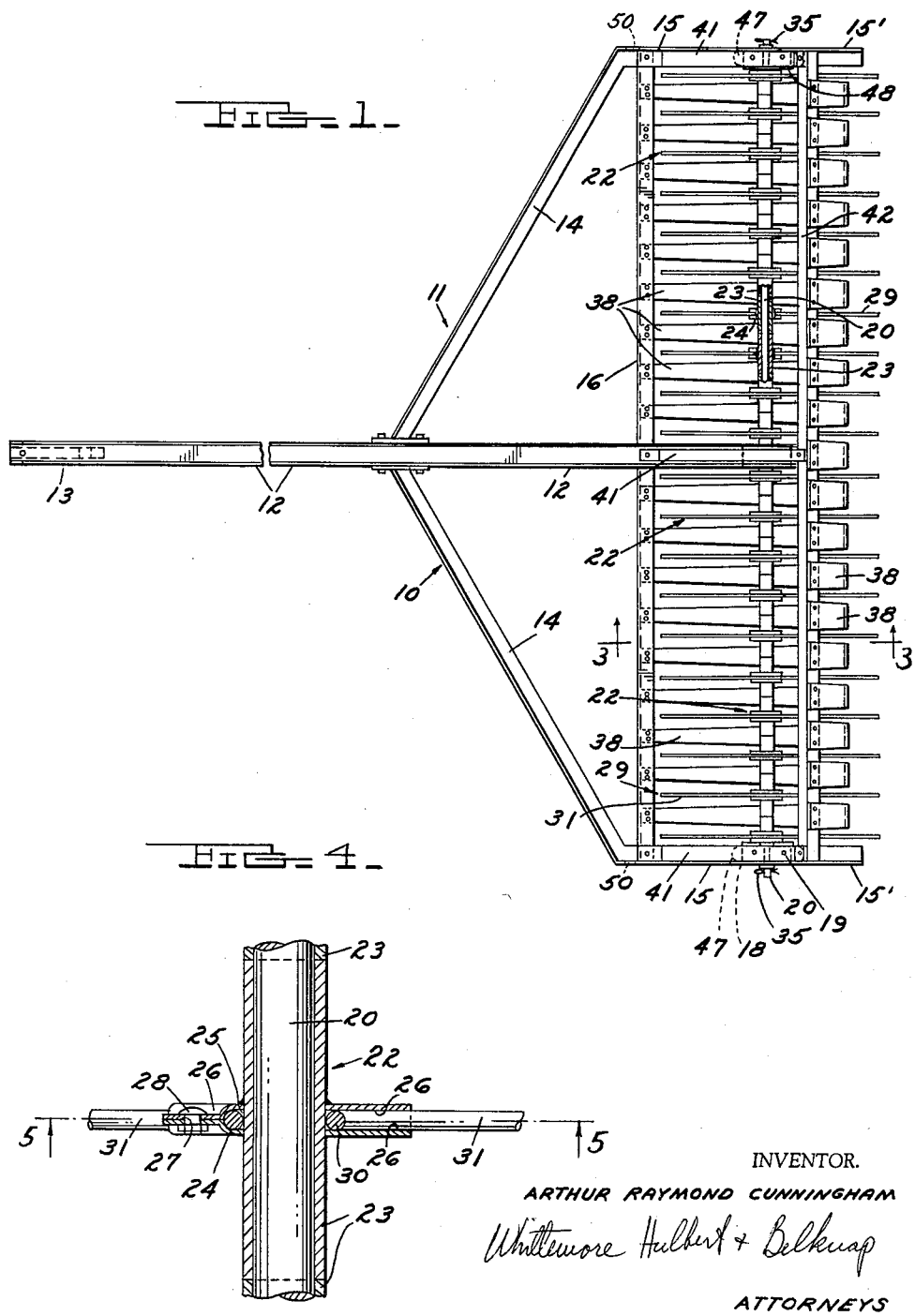
INVENTOR.
ARTHUR RAYMOND CUNNINGHAM
ATTORNEYS April 2, 1963  A. R. CUNNINGHAM  3,083,521
HUB AND TINE ASSEMBLY FOR TEDDER
Original Filed Oct. 25, 1957  2 Sheets-Sheet 2
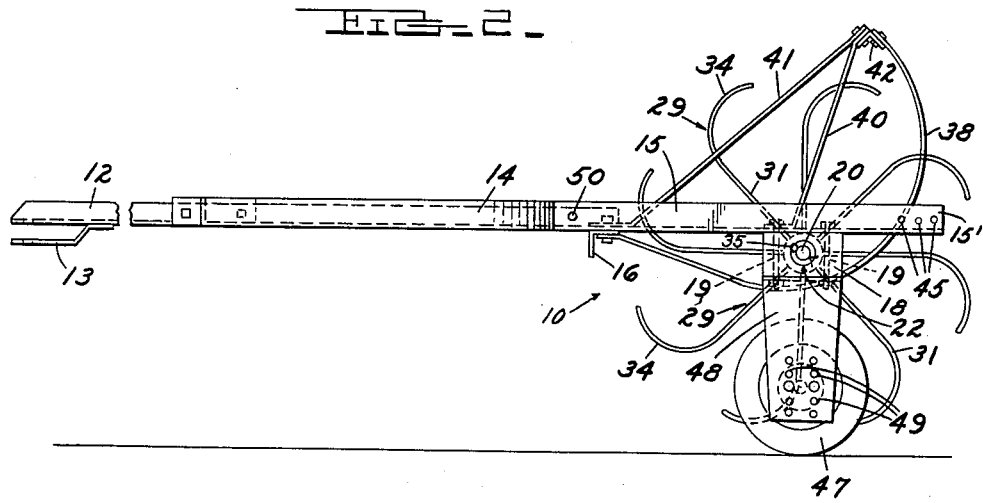
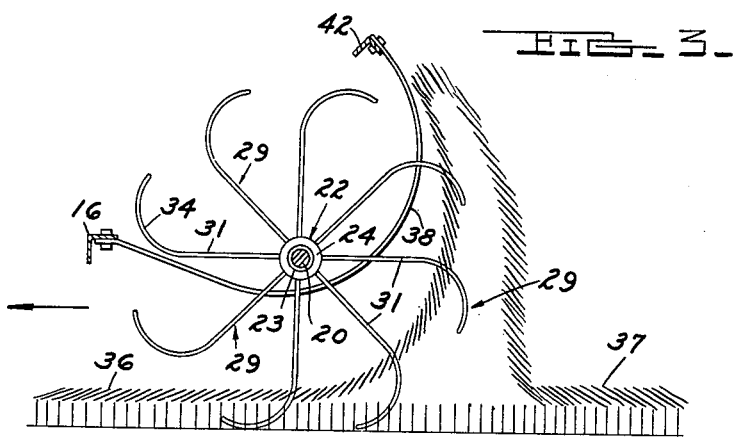
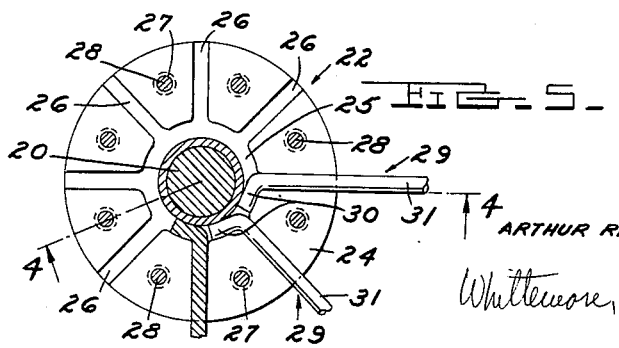
INVENTOR.
ARTHUR RAYMOND CUNNINGHAM
ATTORNEYS

United States Patent Office 3,083,521
Patented Apr. 2, 1963

3,083,521
HUB AND TINE ASSEMBLY FOR TEDDER
Arthur Raymond Cunningham, Chicago, Ill., assignor to Cunningham & Sons, Chicago, Ill., a partnership
Original application Oct. 25, 1957, Ser. No. 692,346, now Patent No. 2,979,880, dated Apr. 18, 1961. Divided and this application Nov. 14, 1960, Ser. No. 68,923
6 Claims. (Cl. 56—372)

This invention relates generally to tedders and refers more particularly to a hub and tine assembly for tedders.

One object of the invention is to provide an improved means for mounting tines on a tedder which will greatly facilitate servicing and replacement of the tines and will enable the manufacture of tedders at minimum cost.

Another object of the invention is to provide an improved means for supporting a plurality of radial tines on a tedder shaft including a pair of disks and means for clamping the disks together with the inner end portions of the tines frictionally gripped therebetween and projecting therefrom in a predetermined circumferentially spaced relation.

Another object of the invention is to provide an improved means for mounting tines on the transverse shaft of a tedder including a tubular hub rotatably sleeved on the shaft, a first disk permanently secured to the hub, a second disk sleeved on the hub, and means for clamping the disks together with the inner end portions of the tines frictionally gripped between the disks.

Another object of the invention is to provide a tine mounting device as described above in which the disks are formed with matching grooves in their opposed surfaces extending radially and spaced apart circumferentially to receive and locate the tines.

Another object of the invention is to provide a tine mounting device as described above wherein the tines have laterally offset portions at the radially inner ends, and the opposed surfaces of the disks are formed to provide matching grooves extending transversely of and merging with the radial matching grooves to receive and grip the offset tine portions.

Another object of the invention is to provide a tine mounting device as described above in association with other tine mounting devices so that the tines are disposed in axially spaced sets with the tines of each set extending radially and in circumferentially spaced relation. In this connection, the disks of each tine mounting device are preferably mounted on a tubular hub, one disk being secured thereto and the other being capable of axial movement, and the hubs of each mounting device are in axial alignment and rotatable relative to one another.

The foregoing, as well as other objects will become more apparent as this description proceeds, especially when considered with the accompanying drawings, wherein:

FIG. 1 is a top plan view, partially broken and in axial section, of a tedder unit constructed according to my invention.

FIG. 2 is a side elevational view of the tedder shown in FIG. 1.

FIG. 3 is a somewhat schematic view in longitudinal vertical section taken on the line 3—3 of FIG. 1, illustrating the tedding operation performed by the improved unit.

FIG. 4 is a fragmentary enlarged view, in section on line 4—4 of FIG. 5, showing a tine-mounting hub sub-assembly as applied to a transverse journaling shaft of the tedder.

FIG. 5 is a fragmentary view in vertical section along the line 5—5 of FIG. 4.

Referring now more particularly to the drawings, and especially to FIGURES 1 and 2, the basic tedder unit is generally indicated by the reference numeral 10. This unit includes a rugged draft frame 11 of angle iron construction, made up of a central draft tongue 12 adapted to be releasably coupled at its forward end to a tractor or like draft vehicle, as by the forked coupling yoke 13. The tongue 12 may be in the form of an elongated, upwardly opening channel section which has bolted thereto, intermediate its length, a pair of rearwardly divergent angle iron arms 14. The rear portions of the divergent arms 14 are angled at 15 to provide extensions parallel to the direction of intended advance of the device, the extensions terminating somewhat behind the central tongue member 12.

An elongated transverse angle iron brace 16 is bolted across the forward part of the extensions 15 and the tongue member 12, forwardly of its rear end, thus making the draft yoke or frame 11 a rigid, rugged unit, yet inexpensive in production cost.

Just forwardly of their rear ends, each of the yoke extensions 15 and draft tongue 12 is provided with a pillow block type of shaft mount 18, secured thereto by bolts or studs 19, and an elongated transverse tine shaft 20 is mounted in these three transversely spaced blocks, which are inexpensively fabricated of wood, for free rotation therein.

The reference numeral 22 generally designates a tine unit or sub-assembly of the tedder 10, of which there are a considerable number uniformly spaced along the length of the shaft 20.

Referring more particularly to FIGURES 4 and 5, each tine unit 22 comprises an elongated cylindrical sleeve or hub element 23, which may be fabricated of a length of inexpensive piping, having mounted thereon a plate device for mounting the tines in the form of a pair of like, sheet metal tine mounting disks or stampings 24 of circular outline, centrally apertured to receive the hub 23. Each disk or stamping 24 is formed to provide an annular embossed groove 25 surrounding the central aperture thereof, and one of the stampings or disks is welded to the hub at this zone. The other stamping or disk is capable of axial sliding movement on the hub. Radial embossed groove formations 26, equally spaced apart circumferentially, extend outwardly from the groove 25 to the periphery of the disks. The disks 24 are provided with registering bolt holes 27 between successive radial grooves 26, and bolts 28 extending through these holes secure the disks together to constitute a unitary assembly with the hub 23 and tines. The grooves 25 are concentric with respect to the hub 23 and the grooves 26 connect into the grooves 25 at their radially inner ends.

The tines 29 may be formed of spring steel and are preferably circular in cross-section, and are clamped between the axially aligned mounting disks with their inner end portions received in the registering grooves 26, as illustrated. In order to effect a rigid displacement resisting mount, each tine has an angularly offset inner anchoring finger 30 at the inner end of its shank 31, and the contour radius of the radial and annular groove embossments 25, 26 is such as to snugly receive and nest the inner end of the shank and its adjoining offset 30.

Thus, the bolts 28 firmly hold the tines clamped in a way to prevent loosening in use. There may be a slight axial spacing between inner flat surfaces of the respective disks 24 when the bolts 28 are applied and taken up, in order to eliminate any possible looseness which might be expected in a stamped structure of this sort.

The shank 31 of each tine extends radially outwardly a substantial length and is then curved in an approximately quarter-circular outline at its terminus 34, in the direction opposite that toward which the tine rotates in passing beneath the shaft 20, that is, as it receives field traction.

The shaft 20 is held against axial movement in the draft yoke or frame 11 by cotter pins 35 applied outwardly of the end pillow blocks 18, and it is seen that the hubs 23 of the tine units 22 maintain the tines 29 in equal axial spacing. The hubs 23 rotate freely on the shaft 20, which also rotates freely in the pillow blocks 18, so that it is seen that the tine units 22 will rotate freely under ground traction. The hubs 23 are in axial alignment and in end-to-end abutting engagement, thus spacing the individual tine units from one another. However, the hubs are capable of rotation relative to one another.

FIGURE 3 illustrates somewhat schematically the tedding action of the unit herein described. The tines may be supported by the wheels of the tedder unit slightly above the ground (FIG. 2) and caused to rotate by engagement with the cut crop lying on the stubble, or as in FIG. 3, the tines may be in actual contact with the ground. The unit shown in FIGURE 3 is moving toward the left or in the direction of the straight horizontal arrow. The tines turn in a counter-clockwise direction by reason either of their engagement with the stubble and the cut crop or by ground engagement, and the crop is lifted by the curved outer ends of the tines and flipped over or ruffled and redeposited on the stubble in a loose overturned and agitated condition for drying. In order to improve the efficiency of the tedding operation, the hay or crop is stripped from the tines 29 as it is first picked up from the mowed swath 36, by the provision of stripping plates or guards 38 between each of the successive tine units. Each tine unit is of course made up of a circumferentially spaced series of radial tines mounted on a hub by the disks 24.

Referring particularly to FIGURE 2, upright strap iron rear braces 40 are bolted to each of the three pillow blocks 18, and further rearwardly and upwardly inclined braces 41 are bolted to the transverse frame angle iron 16, the respective braces 40, 41 of the three sets being in the respective vertical planes of the center draft tongue 12 and the end frame extensions 15. These braces are bolted at their rearward ends to a transversely extending, upward angle iron brace 42, thus making up a very rigidly braced super-structural support.

The guards 38 are of curved sheet metal, being bolted along the length of the cross brace member 42 between the successive tine units 22, from which cross brace they extend downwardly and curve forwardly underneath the shaft 20 and the tine hubs 23. The forward ends of the guards 38 are brought up and bolted along the length of the forward angle iron cross member or frame brace 16.

The extensions 15 of the end frame angle irons 14 project substantially rearwardly at 15' beyond the guards supporting cross brace 42, where they are provided with a plurality of holes 45 for the attachment of a windrow unit to the tedder.

The tedder is provided with the ground engaging wheels 47. As shown in FIGURE 2, a rigid sheet metal fork or brace 48 of inverted U-shape is bolted to the underside of each of the end pillow blocks 18, and each bracket is provided adjacent the lower end thereof with a plurality of mounting holes 49, whereby the wheels 47 may be adjustably mounted at a desired elevation. Hence the sweep of the tines above the ground in a tedding operation may be adjusted, and the wheels of course may be adjusted to a different elevation when moving the unit to and from the field of operation.

The tedding unit is one which may be readily assembled on location, and just as readily taken apart, if necessary, in the event of damage requiring replacement or repair of any component part. The tine mounting hub arrangement is an inexpensive one, yet the individual tines are gripped and firmly held against twist from their proper parallel alignment, and in proper axial spacing. Here again, the provisions are such that one of the circular disks 24 and its welded hub or mounting sleeve 23 may be readily dismantled from the other bolted disk in the event it is desired to replace the damaged tine.

This application is a division of my co-pending application Serial No. 692,346, filed October 25, 1957.

What I claim as my invention is:

1. In tedding apparatus of the type having a frame, a shaft mounted on said frame and a plurality of tedder tines carried by said shaft and projecting generally radially outwardly therefrom in circumferentially spaced relation for rotation about the axis thereof; the improvement comprising means for mounting said tines on said shaft including a clamping device mounted on said shaft, said clamping device comprising axially adjacent coaxial first and second discs formed in their opposed surfaces with matching grooves extending generally radially and spaced apart circumferentially, the inner end portion of each tine being disposed in a set of matching grooves to be frictionally gripped thereby, said tines having laterally offset portions at the radially inner ends thereof, the opposed surfaces of said discs being formed to provide matching grooves extending transversely of and merging with the inner ends of the generally radial grooves to receive and grip said offset tine portions, and means for releasably clamping said discs together in positions such that the generally radial and transverse grooves match as aforesaid.

2. The structure defined in claim 1, wherein said transverse grooves are circular and concentric with said shaft.

3. In tedding apparatus of the type having a frame, a shaft mounted on said frame and a plurality of tedder tines carried by said shaft and projecting generally radially outwardly therefrom in circumferentially spaced relation for rotation about the axis thereof; the improvement comprising means for mounting said tines on said shaft including a tubular hub rotatably sleeved on said shaft, a plate device for securing said tines to said hub, said plate device comprising a first disc permanently secured concentrically to said hub, a second disc sleeved on said hub in coaxial relation with and axially movable relative to the first, the opposed surfaces of said discs being formed to provide matching grooves extending generally radially and spaced apart circumferentially, the inner end portion of each tine being disposed in a set of matching grooves to be frictionally gripped thereby, said tines having laterally offset portions at the radially inner ends thereof, the opposed surfaces of said discs being formed to provide matching grooves extending transversely of and merging with the inner ends of the generally radial grooves to receive and grip said offset tine portions, and means for releasably clamping said discs together in positions such that the generally radial and transverse grooves match as aforesaid.

4. The structure defined in claim 3, wherein said transverse grooves are circular and concentric with said shaft.

5. The structure defined in claim 4, wherein said discs are alike in size and shape.

6. The structure definined in claim 5, wherein said hub is elongated and the ends thereof extend axially beyond said discs when the latter are clamped together as aforesaid.

References Cited in the file of this patent

UNITED STATES PATENTS

| | | |
|---|---|---|
| 349,928 | Denney | Sept. 28, 1886 |
| 1,828,534 | Johnston et al. | Oct. 20, 1931 |
| 2,699,029 | Hubbard | Jan. 11, 1955 |
| 2,867,965 | Goodall et al. | Jan. 13, 1959 |